No. 873,732. PATENTED DEC. 17, 1907.
F. A. DECKER.
BATTERY TRAIN LIGHTING SYSTEM.
APPLICATION FILED APR. 4, 1906.
2 SHEETS—SHEET 1.
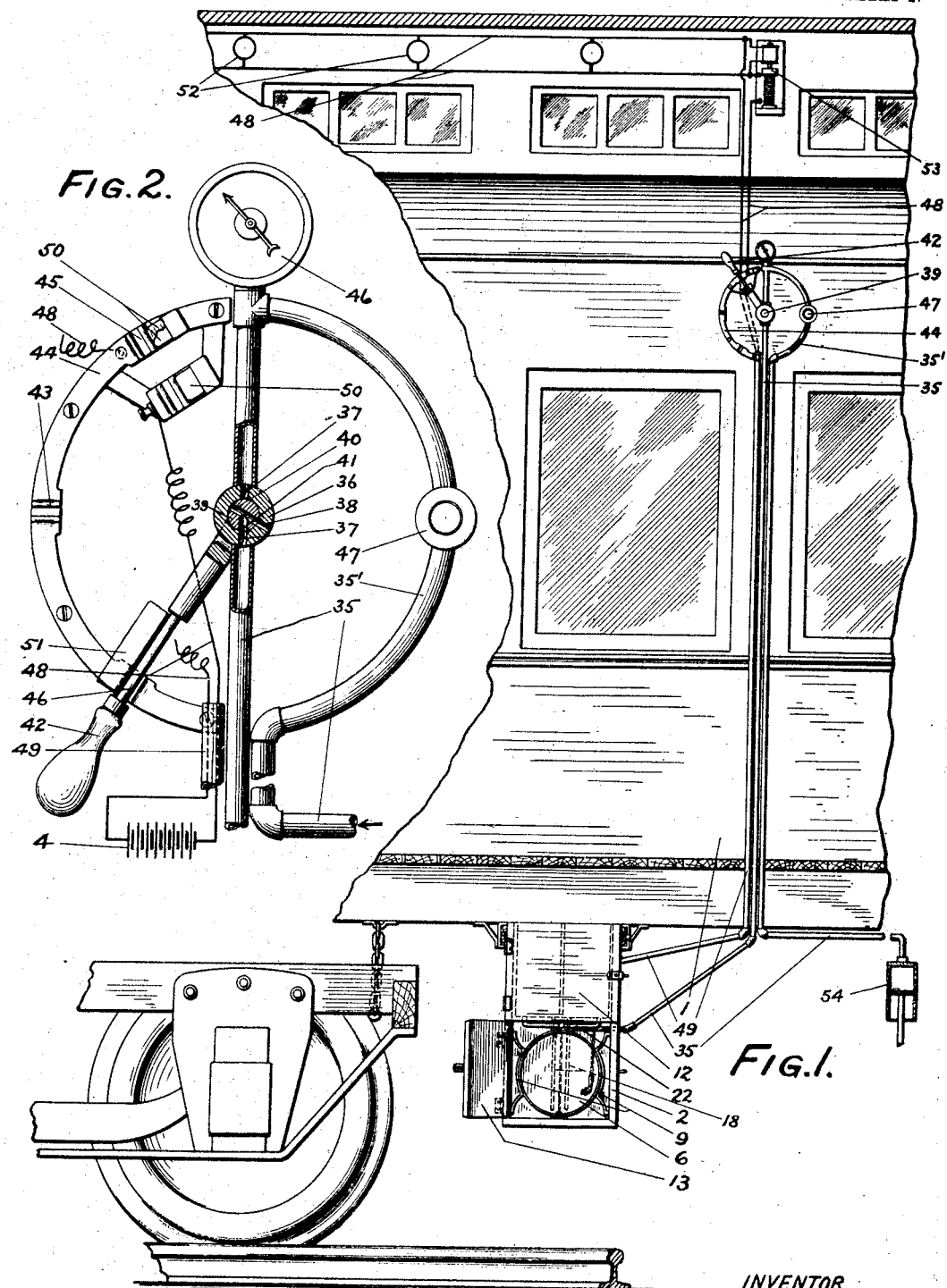
WITNESSES:
INVENTOR
Frank A. Decker
BY
Charles N. Butler
ATTORNEY.

No. 873,732.  
PATENTED DEC. 17, 1907.
F. A. DECKER.  
BATTERY TRAIN LIGHTING SYSTEM.  
APPLICATION FILED APR. 4, 1906.
2 SHEETS—SHEET 2.
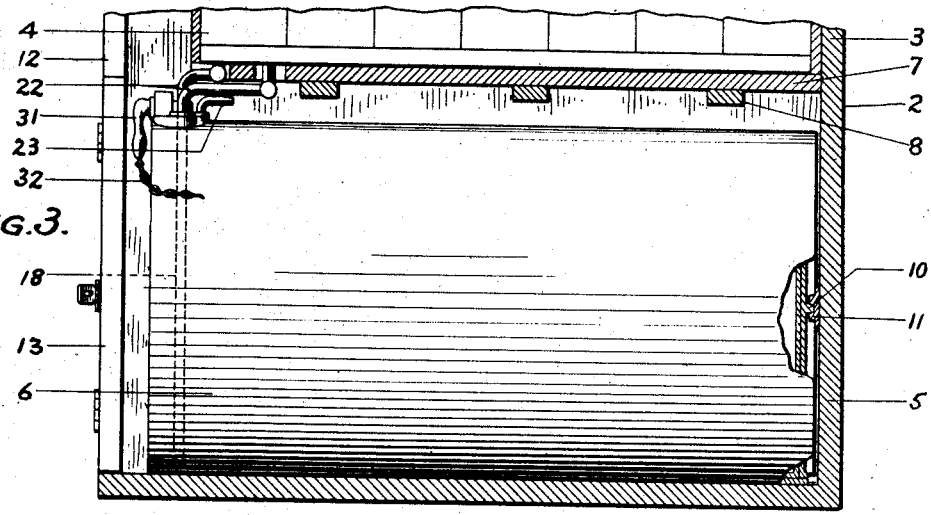
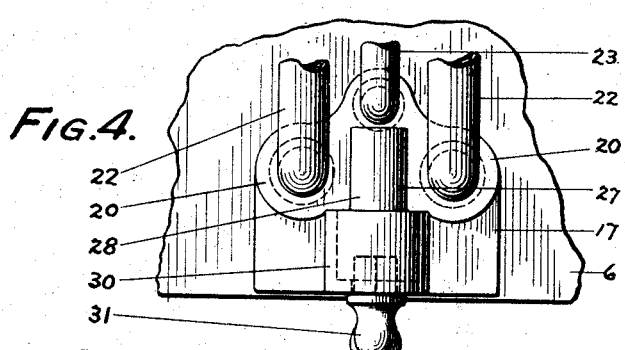
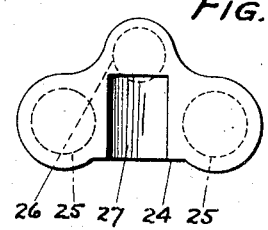
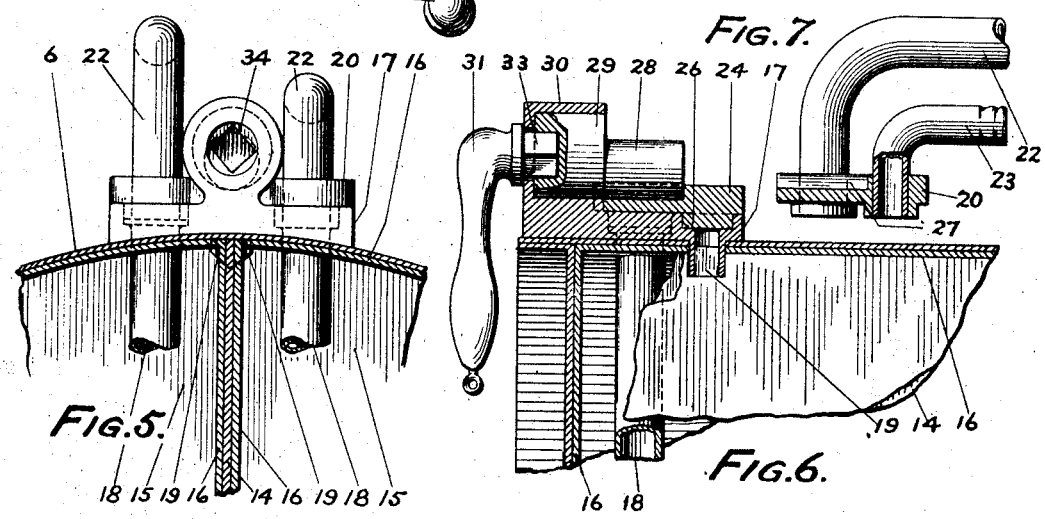
WITNESSES:
INVENTOR  
Frank A. Decker  
BY  
Charles N. Butler  
ATTORNEY.

UNITED STATES PATENT OFFICE.

FRANK A. DECKER, OF PHILADELPHIA, PENNSYLVANIA, ASSIGNOR, BY MESNE ASSIGN-
MENTS, TO DECKER ELECTRICAL MANUFACTURING COMPANY, OF WILMINGTON,
DELAWARE.

BATTERY TRAIN-LIGHTING SYSTEM.

No. 873,732.  Specification of Letters Patent.  Patented Dec. 17, 1907.

Application filed April 4, 1906. Serial No. 309,832.

*To all whom it may concern:*

Be it knawn that I, FRANK A. DECKER, a citizen of the United States, residing at Philadelphia, in the county of Philadelphia and State of Pennsylvania, have invented a Battery Train-Lighting System, of which the following is a specification.

This invention relates to the application of a primary battery to lighting railroad coaches, and its leading purpose is to provide a convenient, practical and efficient system therefor.

In the preferred mode of practicing the invention, there is secured beneath the coach a housing having compartments with means for holding the battery and the tank for the solutions so that both battery and tank can easily be inserted in position for quickly coupling them and readily removed, the mechanism having the important characteristic that a tank containing new solution can be substituted for a tank containing exhausted solution with the readiest facility in making the necessary disconnections and connections. Conduits are connected with the tank and battery so that air can be introduced for the purpose of transferring the solutions and a lighting system is connected with the battery, mechanism being connected therewith for controlling the air and the current.

The system provides the advantage that each car has its independent lighting unit which can be maintained and operated very conveniently and readily, the tank and battery being so placed, constructed and connected that they can be handled and operated with facility while the controlling apparatus is within easy reach and permits the several operations to be governed by a single movement.

The characteristic features will more fully appear by reference to the following description and the accompanying drawings in illustration thereof, of which Figure 1 is a sectional elevation representing the invention in its application to a car, Fig. 2 represents an enlarged view of the controlling mechanism with parts broken away, Fig. 3 represents a sectional view taken through the housing showing the side of the tank and a section of the bottom of the battery, Fig. 4 is a plan view representing the coupling mechanism for connecting the conduits with the tank, Fig. 5 is an end elevation of the mechanism shown in Fig. 4 with the end of the tank broken away, Fig. 6 is a sectional side elevation of the mechanism shown in Fig. 4, Fig. 7 is a sectional side elevation of the coupling with the connected conduits, and Fig. 8 is a plan view of a blank to be substituted for the coupling to seal the tank for transportation.

As shown in the drawings, the car 1 has depending from the bottom thereof the housing 2 having the upper compartment 3 for the battery 4 and the lower compartment 5 for the tank 6. The battery is supported transversely to the car by its casing or crate 7 resting on the sills 8, and the tank is likewise supported transversely to the car by the guides 9, being positioned by engagement of the boss 10 with the socket 11, doors 12 and 13 providing means for closing and opening the compartments. The tank 6 is provided with a partition 14 dividing it into compartments 15 provided with lead linings 16 for holding the solutions.

A coupling member 17 is fixed to the top of the tank at the outer end thereof, through which pass the conduits 18 to the bottoms and the conduits 19 to the tops c the respective compartments. A second coupling member 20, on the conduits 22 connected with the battery compartments, fits the member 17 so that the conduits 18 and 22 register, while a conduit 23 connected with the member 20 communicates with the conduits 19. A blank 24, provided with the bosses 25 and 26 for closing the respective conduits 18 and 19, is substituted for the coupling member 20 when the tank is to be removed. To hold the parts 20 and 24 in engagement with the tank, they are each provided with a bearing 27, and an eccentric 28, having the hub 29 journaled in the bearing 30 of the member 17, is provided for engaging the bearing. A wrench 31 fastened to the tank by a chain 32, has a square hub 33 for engaging the corresponding socket 34 in the hub 29 to turn the eccentric 28 so as to clamp and unclamp the parts 20 and 24. It will be understood that with the tank in its compartment coupled to the battery, it can be disengaged by turning the eccentric so as to unclutch the part 20 which can be lifted out of engagement with the part 17 by reason of the flexibility provided in the connections 22. The tank being now partially withdrawn, the blank 24 is substituted for the part 20 and locked in place. A reversal of this operation takes place in connecting the tank with the battery.

Connected with the conduit 23 is a conduit 35, by means of which air can be forced into the tank to lift the fluids from the tank compartments into the battery through the connecting conduits, or permitted to exhaust when it is desired to drain the solutions into the tank compartments. A cylindrical valve seat 36 having the ports 37 and 38 is set in the conduit 35 and a cylindrical valve 39 with the passages 40 and 41 therein controls these ports. A lever 42 is connected with and operates the valve.

When it is desired to force air into the tank, the lever is turned into position to engage the stop 43 of the controller arc 44, so that the passage 40 is in line with the conduit 35, in which position the port 38 and the passage 41 are closed. The solutions having been lifted from the tank into the battery, the air is held in the tank to support the solutions by turning the lever into position to engage the stop 45 of the arc 44. When it is desired to discharge the air and permit the solution to drain by gravity from the battery into the tank, the lever is turned into engagement with the stop 46, in which position an exhaust passage is provided for the air by way of the port 37, the passages 41 and 40 and the port 38. A gage 46 set at the top of the arc 35' in the conduit 35 leading to the valve mechanism, indicates the pressure and a valve 47 in this arc regulates the pressure. The battery is connected by the conductors 48 (extending through the conduit 49) with the electrically separate and insulated clips or contacts 50 carried by the arc 44, and the lever 42 is provided with the blade 51 which is insulated therefrom, the blade and contacts forming a switch for making and breaking the circuit. This circuit contains the lamps 52 and the automatic volt-regulator 53. It will be understood that when the lever is turned into engagement with the stop 45 to close the circuit the battery has been charged and is operative, and when the lever is thrown back to the initial position in engagement with the stop 46, the circuit is broken by the same operation that turns the two way valve to the exhaust position. It is to be understood that the air or fluid pressure communicated through the conduit 35 may be taken from the train system or provided by a pump 54.

Having described my invention I claim:—

1. A battery, a lamp circuit connected to said battery, a tank, a conduit having a detachable coupling connecting said tank and battery, a conduit connected with said tank so that pressure can be communicated to solution contained therein, a valve for controlling the said last named conduit and means for opening or closing said circuit and operating said valve.

2. A battery, a tank connected therewith, a circuit containing lamps connected with said battery, means for transferring solution between said tank and battery, and mechanisms for controlling said circuit and said transfer of solution by a single operation.

3. A battery, a tank connected therewith, a circuit containing lamps connected with said battery, a conduit leading to said tank for communicating pressure to the solution contained therein, and mechanism for controlling said circuit and said conduit.

4. A battery, a tank connected with said battery by a conduit having a detachable coupling, a conduit for conveying pressure to said tank, a car having housings for said battery and tank, a circuit containing lamps connected with said battery and disposed so as to illuminate the said car, and means for controlling said circuit and said fluid pressure conduit.

5. A tank in combination with a battery, a coupling member connected with conduits communicating with the interior of said tank, an eccentric revoluble in a bearing fixed with relation to the tank and having means for revolving it, and a member connected with said battery which registers with said coupling member and is clamped thereto by said eccentric.

6. A tank having a plurality of compartments, a coupling member having a plurality of passages leading to said compartments and a plurality of passages leading therefrom, a battery member fitting said coupling member and having parts registering with said passages, and means for clamping said members together.

7. A battery, a tank connected with said battery, a conduit leading to said tank, a circuit having contacts therein connected with said battery, a valve for controlling said conduit, and mechanism for simultaneously operating said valve and closing or opening said contacts.

8. A battery having coupling mechanism connected thereto and a tank having a coupling mechanism connected thereto and registering with the coupling mechanism of said battery, said mechanisms having means for admitting fluid pressure to said tank and for conducting solution from said tank to said battery.

In testimony whereof I have hereunto set my hand this 31st day of March, 1906, in the presence of the subscribing witnesses.

FRANK A. DECKER.

Witnesses:
 ROBERT JAMES EARLEY,
 LOUIS H. BUCK.